United States Patent [19]
Guerin et al.

[11] Patent Number: 5,469,430
[45] Date of Patent: Nov. 21, 1995

[54] METHOD AND DEVICES FOR SIMULTANEOUS TRANSMISSION OF TWO HETEROCHRONOUS BINARY SIGNALS ON THE SAME TRANSMISSION MEDIUM

[75] Inventors: Jean-Pierre Guerin, Trelevern; Jean-Francois Robin, Belle-Isle-en-Terre; Francois Roudot, Pleumeur-Bodou, all of France

[73] Assignee: Alcatel Cit, Paris, France

[21] Appl. No.: 120,543

[22] Filed: Sep. 14, 1993

[30] Foreign Application Priority Data

Sep. 15, 1992 [FR] France .................... 92 10968

[51] Int. Cl.$^6$ .............................. H04J 15/00; H04L 5/02
[52] U.S. Cl. .................... 370/37; 370/110.4; 327/407; 327/415
[58] Field of Search .............................. 370/8, 9, 10, 37, 370/110.4, 112, 11, 110.1; 328/104–105, 153–154; 307/243, 244

[56] References Cited

U.S. PATENT DOCUMENTS

| | | | |
|---|---|---|---|
| 4,041,392 | 8/1977 | Gauriat et al. | 370/11 |
| 4,078,153 | 3/1978 | Moreau | 370/9 |
| 4,972,408 | 11/1990 | Le Bihan Hervé et al. | 370/112 |
| 5,349,585 | 9/1994 | Soukae | 370/110.4 |

FOREIGN PATENT DOCUMENTS

3522132A1 12/1986 Germany.

OTHER PUBLICATIONS

Japanese Patent Abstract JP-A-59005739 dated Apr. 18, 1984.
Japanese Patent Abstract JP-A-59 040 735 dated Jun. 19, 1984.
French Search Report FR 9210968 dated Feb. 9, 1993.

Primary Examiner—Hassan Kizou
Attorney, Agent, or Firm—Sughrue, Mion, Zinn, Macpeak & Seas

[57] ABSTRACT

In a method for simultaneous transmission of two heterochronous binary signals in the form of a single binary signal on a common physical medium, the second binary signal is timed by a bit clock whose period is greater than the minimal duration allowed for a bit of the first signal. For constituting the single binary signal transmitted there is provision for inserting between transitions of the first binary input signal a brief binary level inverting pulse for each bit of the second input signal which corresponds to the same one of the two possible binary levels of the second signal. Each temporary polarity inversion pulse due to the second signal is placed outside a guard area on either side of transitions of the first signal.

12 Claims, 3 Drawing Sheets

5,469,430

METHOD AND DEVICES FOR SIMULTANEOUS TRANSMISSION OF TWO HETEROCHRONOUS BINARY SIGNALS ON THE SAME TRANSMISSION MEDIUM

BACKGROUND OF THE INVENTION

1. Field of the invention

The invention concerns a method and devices for simultaneous transmission of two heterochronous binary signals on the same transmission medium.

2. Description of the Prior art

The transmission of signals, and especially binary signals, on a given transmission medium usually entails the use of a sampling clock whose frequency is much higher than the maximum frequency of the signal or signals transmitted.

This method entails multiplexing samples of the signals and a master clock at the sending end produces synchronization patterns to be used at the receiving end for demultiplexing.

This known method is well suited to many applications, especially ones using CMOS technology. It is not technologically or economically viable in other applications, however, in particular if ECL components must be used.

The invention proposes a method for simultaneous transmission of two heterochronous binary signals in the form of a single binary signal on a common physical transmission medium, the second signal being timed by a bit clock whose bit period is greater than the minimal duration allowed for a bit of the first signal.

SUMMARY OF THE INVENTION

In one aspect the invention consists in a method for simultaneous transmission of two heterochronous binary signals in the form of a single binary signal on a common physical medium, the second of said binary signals being timed by a bit clock whose bit period is greater than the minimal duration allowed for a bit of said first signal, in which method for constituting said single binary signal transmitted there is provision for inserting between transitions of said first binary input signal a brief binary level inverting pulse for each bit of said second input signal which corresponds to the same one of the two possible binary levels of said second signal, each temporary polarity inversion pulse due to said second signal being placed outside a guard area on either side of transitions of said first signal.

In this description the expression "polarity inversion" refers to inversion of the binary level of the transmitted signal brought about by the second signal in order to distinguish these from inversion of the binary level due only to the first signal.

The invention also proposes an encoder device for a send unit employing the method in accordance with the invention.

In a second aspect the invention consists in an encoder device comprising:

a set of two time-delay circuits in series having the same period, the first time-delay circuit receiving the first binary input signal to be transmitted, the output signal of the second time-delay circuit being delayed relative to the first input signal by a time corresponding to the guard time, a memory receiving the second binary input signal to be transmitted, a first logic circuit receiving the first input signal and the output signal of the second time-delay circuit and supplying a polarity inversion enabling signal, a second logic circuit receiving the polarity inversion enabling signal and a signal requesting insertion of a temporary polarity inversion pulse supplied by the memory due to the action of the second binary input signal for each of the pulses of a fixed binary value of this signal, a monostable whose period is equal to the duration selected for the temporary polarity inversion pulses applied to the transmitted signal, the monostable being connected to the output of the second logic circuit which triggers it as soon as an insertion requests and an inversion enabling signal are simultaneously present at the second logic circuit, and a third logic circuit receiving the first input signal with a time-delay due to the first time-delay circuit and the signal for inverting the polarity of the first input signal supplied by the monostable when triggered, this third logic circuit supplying the signal to be transmitted which is obtained either directly from the first input signal or by temporary inversion of the polarity of this signal when the monostable has been triggered for a time equal to the period of the monostable.

The invention also proposes a decoder device for a receive unit employing the method in accordance with the invention.

In a third aspect the invention consists in a decoder device comprising:

a set of two time-delay circuits which have periods of the same order of magnitude and which are connected in series, the first time-delay circuit receiving the binary signal transmitted, a first logic circuit supplying a signal corresponding to the first input signal by logical manipulation of the transmitted signal and two signals respectively delayed by the two time-delay circuits, and a second logic circuit supplying a signal corresponding to the second input signal by logical combination of the reconstituted first signal and the delayed second signal.

The invention, its features and its advantages are explained in the following description given with reference to the following figures.

DETAILED DESCRIPTION OF THE INVENTION

As already mentioned, the object of the invention is to enable simultaneous transmission of two heterochronous binary signals A and B.

Figure 1:
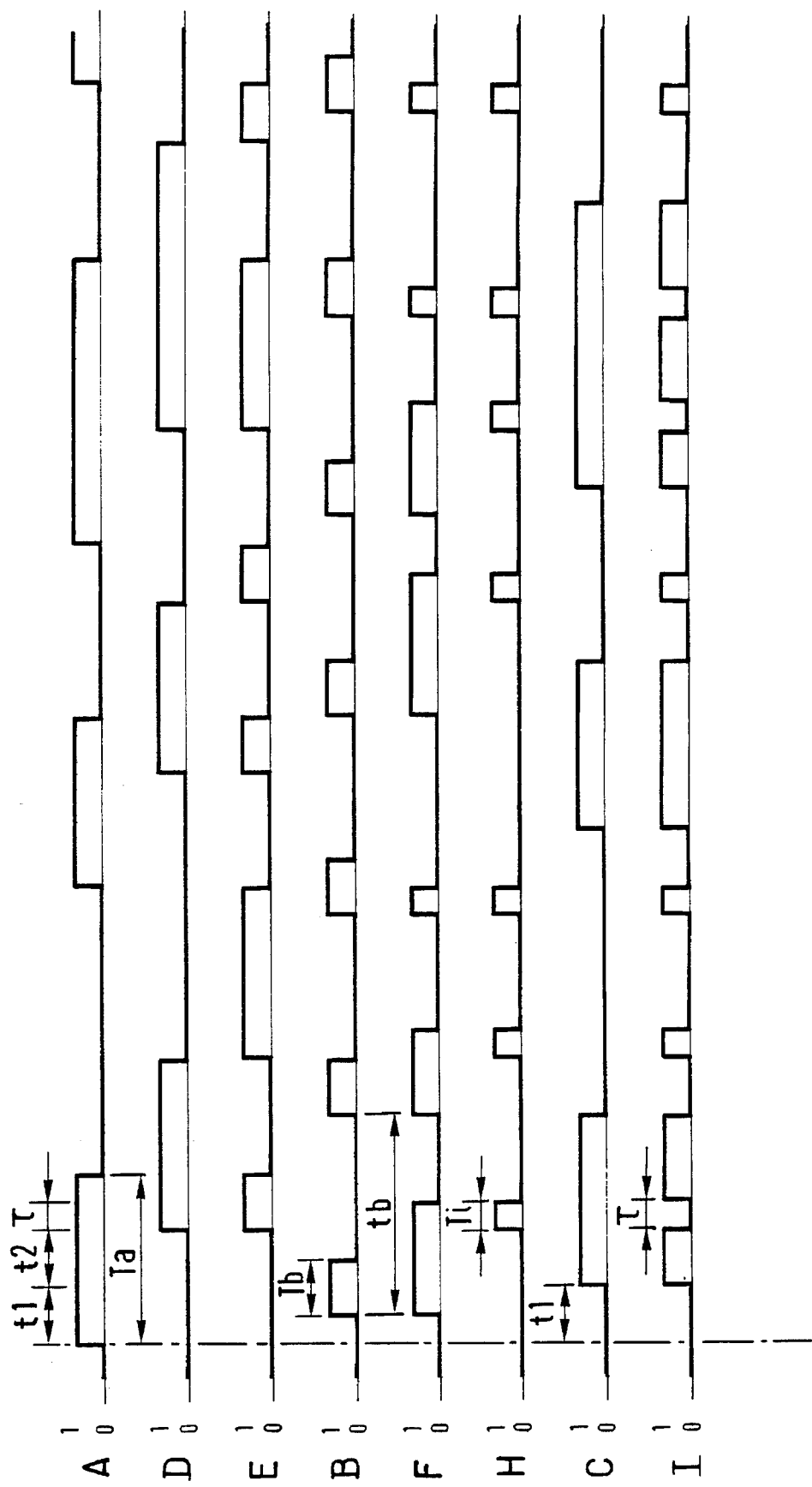
FIGS. 1 and 2 each show a timing diagram representative of one example of implementation of a method in accordance with the invention, one in a send unit and the other in a receive unit.

Referring to FIG. 1, the input binary signal A may have any format and any bit rate. It is to be sent transparently, without introducing any jitter and without modifying the initial duty cycles. There are naturally limits that the signal A must comply with, in particular a maximal bit rate D1 acceptable by the physical transmission medium used.

The maximal transmission bit rate Da for the signal A must be less than the maximal bit rate D1 if bits of another binary signal B are to be transmitted among the bits specific to the signal A.

The second input binary signal B is a signal whose frequency and repetition rate may vary within wide ranges although certain limits must not be exceeded, in particular an upper limit on the bit rate.

This must necessarily be lower than the maximal bit rate D1 allowed by the transmission medium and is also dependent on the bit rate permitted for the input signal A.

In one embodiment of the invention the maximal bit rate Da for the input signal A is in the order of 10 Mbit/s and the maximal bit rate Db for the input signal B is 2 Mbit/s, these values being given by way of example and not being limiting on the invention.

The invention uses the time intervals between transitions (binary level changes) of one input signal, here the input signal A, to introduce brief inversions of binary level, referred to herein as polarity inversions, which are representative of the input signal B.

In a preferred embodiment only the portions of the input signal B at a particular one of the two possible binary levels of this signal are acted on directly, each of these portions being between two transitions of signal B.

In the example described the bits which form the short portions of the input signal B having the binary value "1" are acted on, as shown in FIG. 1.

Each of these bits at "1" of the input signal B is individually represented in the transmitted signal I by a temporary polarity inversion of duration Ti which briefly changes the binary level otherwise imposed on the signal I by the input signal A and which in practice corresponds to a pulse shorter than those associated with the input signal A alone.

Each temporary polarity inversion pulse due to the action of the signal B is inserted between two transitions due to the signal A; a plurality of temporary polarity inversion pulses may be inserted into the transmitted signal I between two transitions due to successive binary level changes of the input signal A, provided that the respective compositions of the input signals A and B allow this.

To enable reconstitution of the signals A and B from the signal I in which they are transmitted it is necessary for the actions which produce the transmitted signal I to be such that at least one distinctive characteristic of one and/or the other is retained.

It is therefore assumed here that the input signal B (see FIG. 1) is a binary signal timed by a clock of a particular frequency available at the sending and receiving ends, possibly after recovery at the receiving end.

Figure 2:
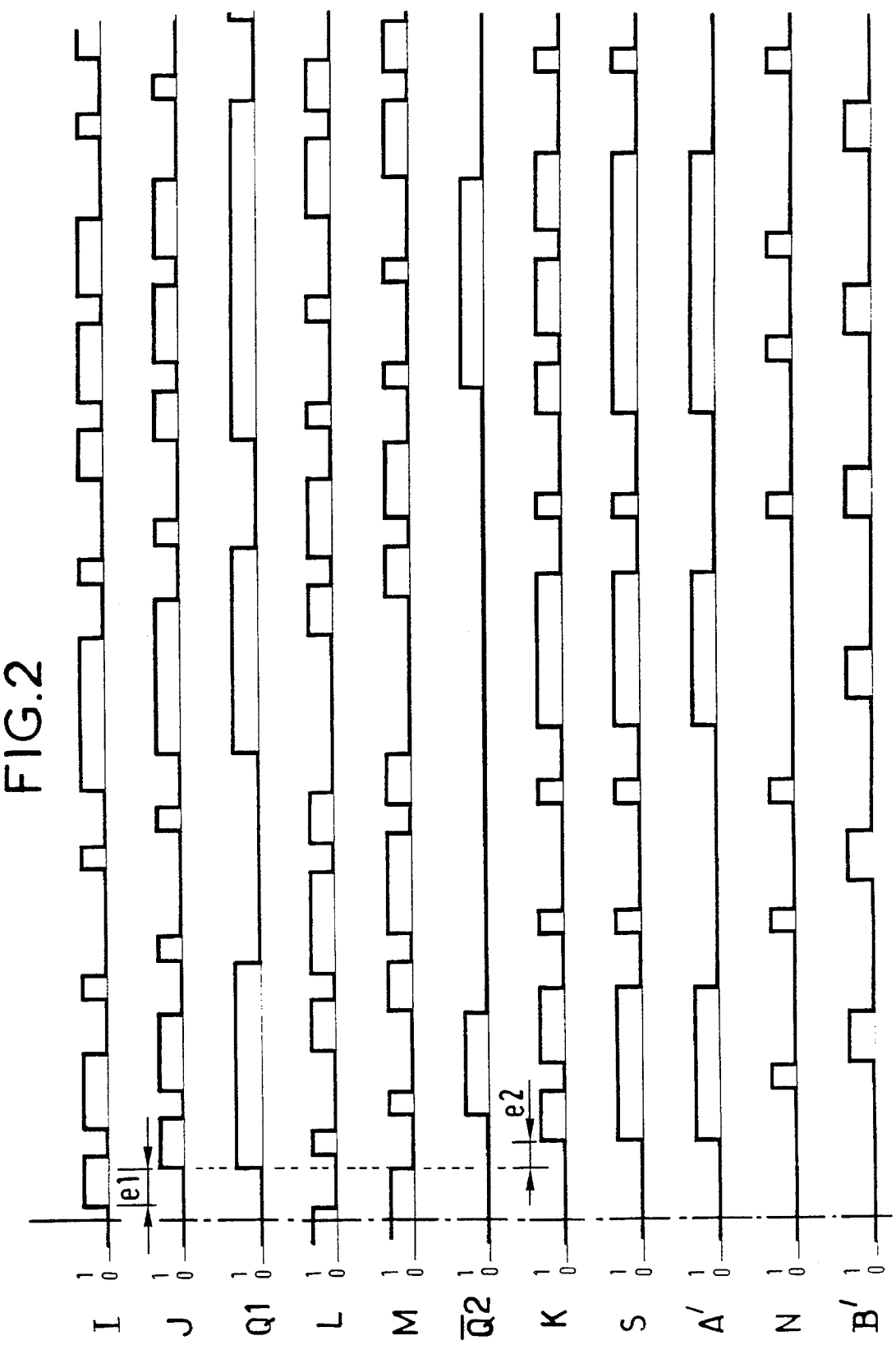

For reasons associated with the bit rate the temporary polarity inversion pulse intended to translate each bit of the coded input signal B, here at "1" and of duration Tb, is preferably chosen to have a short duration. However, the duration Ti of a pulse for temporarily inverting the polarity of the transmitted signal I may not be less than the minimal value τ which is allowed if a pulse is to be transmitted over the selected transmission medium. In the example shown in the figures and in particular in FIGS. 1 and 2 the value Ti is chosen to be equal to τ.

To prevent confusion at the receiving end between a transition of the transmitted signal I representing a change of binary value of the input signal A and a transition of this signal I representing one flank of a temporary polarity inversion pulse of duration Ti due to the action of the input signal B there is provision for preventing any temporary polarity inversion in the signal I to be transmitted which is too close to a transition due to signal A.

To this end a guard time is applied on each side of binary transitions of the input signal A. This introduces an insertion delay into the transmitted signal I for each temporary polarity inversion pulse due to the action of the signal B which must be dealt with during this guard time and which is therefore inserted only afterwards.

In a preferred embodiment of the invention the guard time, whose minimal value is greater than twice Ti, is preferably made up of two basic times t1 and t2, each of which is equal to twice the value of Ti.

Because of this the respective minimal values allowed for the duration Ta of a pulse of input signal A and for the minimal duration tb between two successive occurrences of bits of input signal B are such that the following relationships apply, for example:

$$Ta \geq t1+t2+T+\tau+\epsilon \text{ and } tb \geq Ta+\epsilon$$

where ε is the minimal time lapse due to the propagation of the signal and to the presetting of the circuits involved in transmission.

Figure 3:
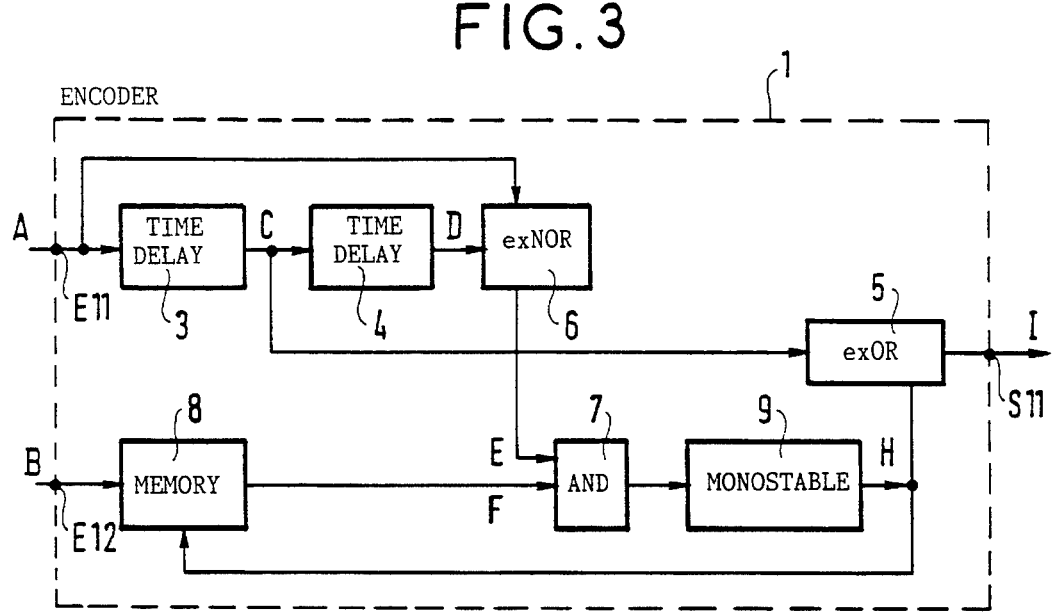
FIG. 3 is a block diagram of an encoder device for a send unit employing a method in accordance with the invention.
Figure 4:
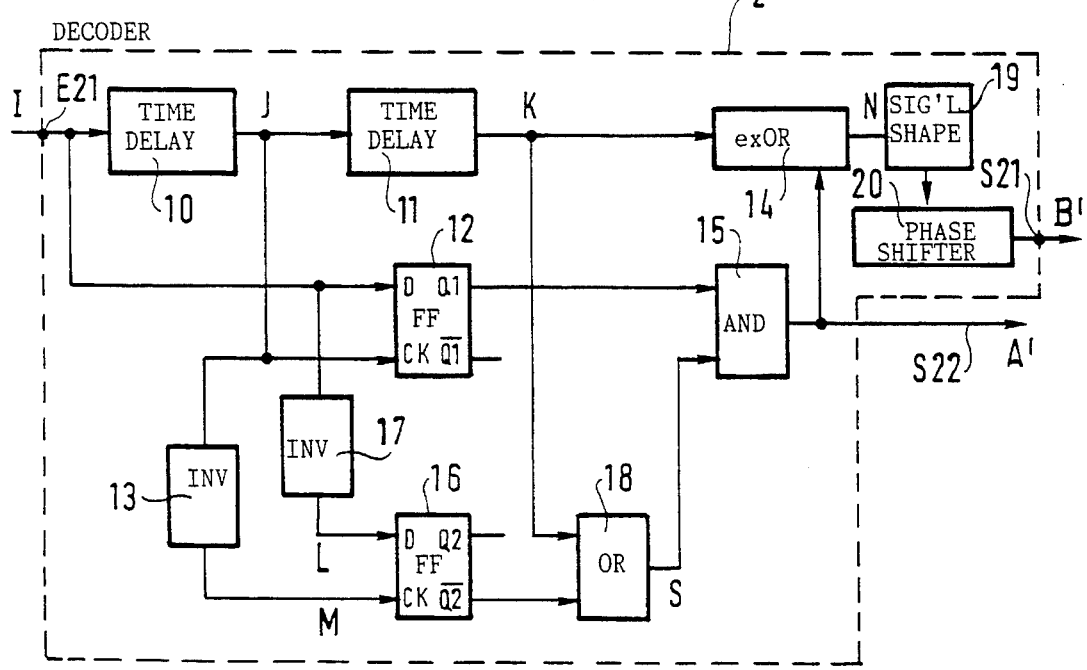
FIG. 4 is a block diagram of a decoder device for a receive unit employing a method in accordance with the invention.

According to the invention the transmission method can be applied by an encoder 1 at the sending end (FIG. 3) and a complementary decoder 2 at the receiving end (FIG. 4).

The encoder 1 is designed to be incorporated into a send unit (not shown) and has two inputs E11 and E12 on which the input binary signals A and B are respectively received and an output S11 for the signal I to be transmitted to the decoder 2 over the selected transmission medium (not shown) which may be an optical fiber medium, for example.

Two time-delay circuits 3 and 4 are connected in series to the input E11 of the encoder 1. The time-delay circuit 3 transmits the input signal A to the time-delay circuit 4 and to a first input of an exclusive-OR gate 5 with a time-delay equal to t1, as defined above. The signal C fed to the two circuits 4 and 5 is shown in FIG. 1.

The time-delay circuit 4 transmits the signal C it receives to a first input of an exclusive-NOR gate 6 with a time-delay equal to t2 as defined above. A second input of the gate 6 is connected to the input E11 of the encoder from which it receives the input signal A. The signal D supplied by the time-delay circuit 4 is delayed by an amount t1+t2 relative to the signal A and consequently the signal E supplied by the gate 6 is an enabling signal, here of binary level "1", which defines the time periods during which a pulse corresponding to a temporary polarity inversion caused by the incident signal B may be inserted into the signal to be transmitted and by contrast those in which insertion is not allowed.

The signal E is passed to a first input of an AND gate 7 which has a second input connected to the output of a memory 8 receiving the input signal B from the input E12.

The memory 8 supplies at its output a signal F for causing a brief change of binary value in the transmitted signal I, this binary value being otherwise dependent on that of the input signal A. As mentioned above, in this example it is the rising edges of the pulses at binary "1" of the input signal B which command the change to binary level "1" of the signal F, this level being maintained by the memory 8 until a falling edge of the signal H appears at the output of a monostable 9 connected to the output of the gate 7. The monostable 9 is triggered when the signal F at the input of the gate 7 has a binary level (level "1" in this example) which corresponds to a request for insertion of a temporary polarity inversion pulse and such insertion is simultaneously enabled by the signal E, which is also at "1" in this example.

The period of the monostable 9 corresponds to the value Ti defined above so that the signal H supplied by this monostable and applied to the gate 5 is combined with the signal C corresponding to the signal A delayed by a time t1 so that the binary value of the resulting signal I is inverted for a time Tb relative to that controlling the signal C. In FIG. 1, each inversion triggered by a pulse at binary "1" of the signal H at the output of the monostable 9 produces a pulse of duration Ti which inverts for this time period Ti the value of the signal I relative to the signal C and the falling edge of which cancels the inversion request from the memory 8 (signal F).

The decoder shown in FIG. 4 is designed to be incorporated into a receive unit (not shown) and has an input E21 at which it receives the signal I via a transmission medium (not shown). It has two outputs S21 and S22 respectively supplying the signals A' and B' reconstituted from the signal I.

This signal is initially applied to a time-delay circuit 10 connected to the input E21 of the device. The period e1 of this time-delay circuit is chosen such that the condition Ti<e1<2.Ti is satisfied. The signal J obtained at the output of the time-delay circuit 10, which therefore corresponds to the signal I delayed by a time e1, is applied to a second time-delay circuit 11 having a period e2 such that Ti<e2<2.Ti, to a clock input Ck of a D type flip-flop 12 and to an inverter 13.

The signal K at the output of the time-delay circuit 11 which corresponds to the signal I successively delayed by a time e1 and a time e2 is applied to an exclusive-OR gate 14.

The flip-flop 12 is connected to the input E21 of the decoder 2 and therefore receives the signal I on its data input D. It therefore produces a direct binary signal Q1 which corresponds to the binary value of the signal determined at each rising edge of the signal J. This signal Q1 is applied to a first input of an AND gate 15. The inverter 13 drives the clock input Ck of a D type flip-flop 16 which is connected to the input E21 via an inverter 17. The complemented output $\overline{Q2}$ of the flip-flop 16 drives a first input of an OR gate 18 which receives the output signal K of the second time-delay circuit 11 on its second input. The logic operation K.$\overline{Q2}$ effected by the OR gate 18 eliminates from the signal K the temporary polarity inversions of binary value "0" which are present in the signals I and K due to the interaction of the input signal B and the input signal A.

The output signal S of the OR gate 18 is applied to a second input of the AND gate 15 which receives the signal Q1. The logic operation S.Q1 effected by the AND gate 15 eliminates from the signal S temporary polarity reversals of binary value "1" due to the action of the input signal B on the input signal A. The output signal A' from the AND gate 15 is therefore a reconstitution of the input signal A at the decoder 2 and is transmitted as such to the output S22 of the decoder.

The signal A' is also applied to a second input of the exclusive-OR gate 14 which receives the signal K at a first input.

The logic operation K⊕A' effected by the logic circuit 14 reconstitutes the signal H produced during coding firstly by retaining the portions of the signal at binary level "1" which are only in the signal K and not in the signal A' and which consequently cannot correspond to portions of signal at binary "1" due only to the input signal A and secondly by inverting the portions at binary "0" of the signal K which correspond to a binary "1" level of the signal A' and consequently to temporary polarity inversions due to the action of the input signal B on the input signal A.

The output signal N obtained in this way at the output of the exclusive-OR gate 14 which corresponds approximately to the reconstituted signal H is here applied to a signal shaping circuit 19 for converting the portions of binary value "1" of the signal N, if required, into pulses of binary value "1" having the duration and amplitude characteristics of the corresponding pulses of the input signal B.

The output signal of the signal shaping circuit 19 is applied to the input of a phase shifter 20 controlled by the clock signals used for encoding at the sending unit end, these signals being transmitted to or recovered at the receiving unit in any known manner that need not be described here in that it does not form any part of the invention.

The signal B' at the output of the phase shifter 20 therefore corresponds to the input signal B reconstituted at the decoder 2 and as such is passed to the output S21 of the latter.

There is claimed:

1. A method for simultaneously transmitting a first and a second binary input signal as a single binary signal on a common physical medium, said second binary input signal being timed by a bit clock having a period greater than an allowed minimal bit duration of said first binary input signal, said first binary input signal being heterochronous with respect to said second binary input signal, said method comprising the steps of:

(a) delaying said first binary input signal for a first delay interval to produce a first delayed output signal;

(b) delaying said first delayed output signal for a second delay interval to produce a second delayed output signal, said second delay interval being substantially equal to said first delay interval;

(c) logically combining said first binary input signal and said second delayed output signal to produce an enabling signal that defines unguarded time intervals;

(d) generating a requesting signal each time a predetermined binary value is detected in said second binary input signal; and (e) inserting a binary level inverting pulse whenever said enabling signal and said requesting signal are simultaneously present, between transitions of said first delayed output signal, to produce said single binary signal, said binary level inverting pulse having a fixed duration at least equal to said allowed minimal bit duration.

2. The method as set forth in claim 1, wherein:

said first binary input signal has a given signal transition at a given time and a subsequent signal transition at a subsequent time;

said first delay interval and said second delay interval define a duration of first and second guard time interval portions, respectively;

said second guard time interval portion begins at said given time, and said first guard time interval portion concludes at said subsequent time; and step (c) further comprises the step of generating said enabling signal during an unguarded time interval defined by a conclusion time of said second guard time interval portion and a beginning time of said first guard time interval portion.

3. A method for separating a single binary signal having embedded binary level inverting pulses into a first reconstituted signal and a second reconstituted signal, comprising the steps of:

(a) delaying said single binary signal for a first delay interval to produce a first auxiliary signal;

(b) delaying said first auxiliary signal for a second delay interval to produce a second auxiliary signal;

(c) logically combining said single binary signal, said first auxiliary signal, and said second auxiliary signal to eliminate said binary level inverting pulses from said single binary signal and to derive said first reconstituted signal; and (d) logically combining said first reconstituted signal and said second auxiliary signal to derive said second reconstituted signal.

4. The method as set forth in claim 3, wherein:

said single binary signal comprises a first and a second binary input signal simultaneously transmitted on a common physical medium, said second binary input signal is timed by a bit clock having a period greater than an allowed minimal bit duration of said first binary input signal, said first binary input signal is heterochronous with respect to said second binary input signal, and said single binary signal is generated by the steps of:

(f) delaying said first binary input signal for a first delay interval to produce a first delayed output signal;

(g) delaying said first delayed output signal for a second delay interval to produce a second delayed output signal, said second delay interval being substantially equal to said first delay interval;

(h) logically combining said first binary input signal and said second delayed output signal to produce an enabling signal that defines unguarded time intervals;

(i) generating a requesting signal each time a predetermined binary value is detected in said second binary input signal; and (j) inserting a binary level inverting pulse whenever said enabling signal and said requesting signal are simultaneously present, between transitions of said first delayed output signal, to produce said single binary signal, said binary level inverting pulse having a fixed duration at least equal to said allowed minimal bit duration.

5. The method as set forth in claim 4, wherein:

step (d) is performed by applying an exclusive-OR logical operation to derive said second reconstituted signal.

6. The method as set forth in claim 5, wherein:

step (c) is performed to eliminate, in order, said binary level inverting pulses having a first binary value, and then binary level inverting pulses having a second binary value.

7. The method as set forth in claim 3, wherein:

step (d) is performed by applying an exclusive-OR logical operation to derive said second reconstituted signal.

8. The method as set forth in claim 3, wherein:

step (c) is performed to eliminate, in order, said binary level inverting pulses having a first binary value, and then binary level inverting pulses having a second binary value.

9. An encoder device for simultaneously transmitting first and second heterochronous binary input signals as a single binary signal on a common physical medium, said second binary input signal being timed by a bit clock having a period greater than an allowed minimal bit duration of said first binary input signal, said device comprising:

a first time delay circuit having a first delay interval, and receiving, as an input, said first binary input signal, and producing a first delayed output signal;

a second time delay circuit having a second delay interval, and receiving, as an input, said first delayed output signal, and producing a second delayed output signal, said second delay interval being the same as said first delay interval;

a first logic circuit for logically combining said first binary input signal and said second delayed output signal, and for producing an enabling signal which defines unguarded time intervals of said first binary input signal;

a memory for producing a requesting signal each time a predetermined binary value is detected in said second binary input signal;

a second logic circuit for receiving, as inputs, said enabling signal and said requesting signal, and producing a polarity inversion signal when said enabling signal and said requesting signal are simultaneously present;

a monostable for producing a binary level inverting pulse in response to said polarity inversion signal, said memory producing said requesting signal in response to said binary level inverting pulse; and a third logic circuit having, as two inputs, said binary level inverting pulse and said first delayed output signal, and producing said single binary signal by applying an exclusive-OR logical operation to said two inputs, so that said binary level inverting pulse is inserted into said first delayed output signal during said unguarded time intervals.

10. The encoder device as set forth in claim 9, wherein:

said first binary input signal has a given signal transition at given time and a subsequent signal transition at a subsequent time;

said first delay interval and said second delay interval define a duration of first and second guard time interval portions, respectively;

said second guard time interval portion begins at said given time, and said first guard time interval portion concludes at said subsequent time; and said first logic circuit produces said enabling signal during an unguarded time interval defined by a conclusion time of said second guard time interval portion and a beginning time of said first guard time interval portion.

11. A decoder device for separating a single binary signal, having embedded binary level inverting pulses, into a first reconstituted signal and a second reconstituted signal, said device comprising a first and a second time delay circuit, and a first and a second logic circuit;

said single binary signal having been obtained from a first original binary signal and a second original binary signal;

said second original binary signal having been timed by a bit clock having a period greater than an allowed minimal bit duration of said first original binary signal;

said second original binary signal being represented in said single binary signal by said binary level inverting pulses being inserted into said first original binary signal;

wherein said first time delay circuit accepts said input binary signal, applies a first time delay interval, and produces a first auxiliary signal;

wherein said second time delay circuit accepts said first auxiliary signal, applies a second time delay interval, and produces a second auxiliary signal, said first time delay interval being of a same order of magnitude as said second time delay interval;

wherein said first logic circuit produces said first reconstituted signal, representative of said first original binary signal, by successive elimination of said binary level inverting pulses from said single binary signal;

wherein said first logic circuit has, as inputs, said single binary signal, said first auxiliary signal, and said second auxiliary signal; and wherein said second logic circuit produces said second reconstituted signal, representative of said second original binary signal, by applying an exclusive-OR logical operation to said first reconstituted signal and to said second auxiliary signal.

12. The decoder device as set forth in claim 11, wherein:

said first logic circuit eliminates, in order, said binary level inverting pulses having a first binary value, and then binary level inverting pulses having a second binary value;

and said second reconstituted signal is made of pulses corresponding only to said binary level inverting pulses embedded in said single binary signal.

* * * * *